(No Model.) 2 Sheets—Sheet 1.
G. G. POWELL.
CHANGEABLE SPEED GEAR FOR BICYCLES.
No. 548,390. Patented Oct. 22, 1895.
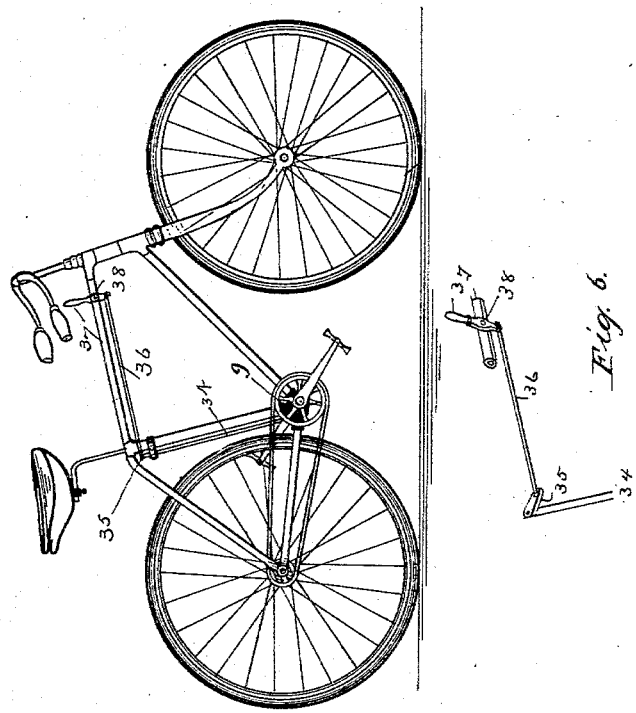
Witnesses
Bertha Lucas
C. H. Olds,
Inventor
George G. Powell,
by Wm M. Monroe
Attorney (No Model.) 2 Sheets—Sheet 2.
G. G. POWELL.
CHANGEABLE SPEED GEAR FOR BICYCLES.
No. 548,390. Patented Oct. 22, 1895.
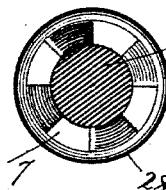
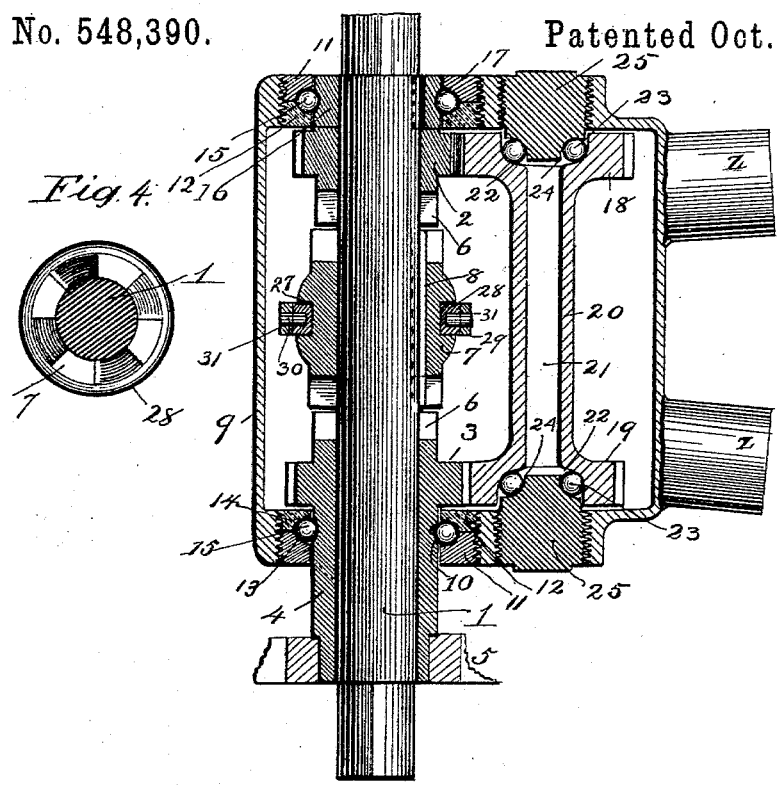
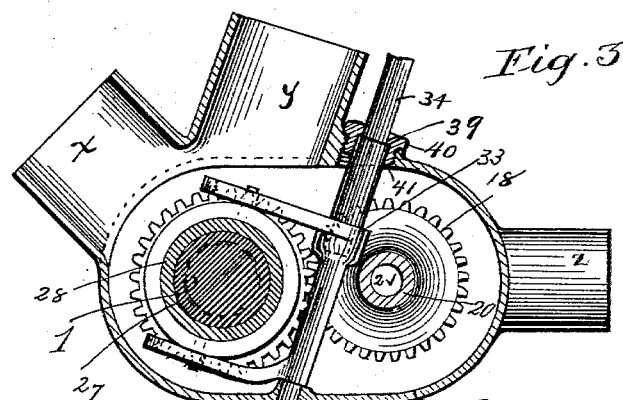
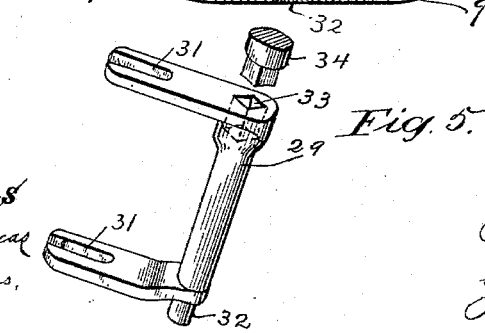
Witnesses
Bertha Lucas
C. H. Olds.
Inventor
George G. Powell
by Wm. M. Monroe
Attorney
ANDREW B.GRAHAM. PHOTO-LITHO. WASHINGTON,D.C.

UNITED STATES PATENT OFFICE.

GEORGE G. POWELL, OF CLEVELAND, OHIO.

CHANGEABLE-SPEED GEAR FOR BICYCLES.

SPECIFICATION forming part of Letters Patent No. 548,390, dated October 22, 1895.

Application filed January 8, 1895. Serial No. 534,279. (No model.)

*To all whom it may concern:*

Be it known that I, GEORGE G. POWELL, a citizen of the United States, and a resident of Cleveland, county of Cuyahoga, State of Ohio, have invented certain new and useful Improvements in Changeable-Speed Gearing, of which I hereby declare the following to be a full, clear, and exact description, such as will enable others skilled in the art to which it appertains to make and use the same.

My invention relates to improvements in changeable-speed gearing for bicycles; and the objects of the invention are to provide means for alternately reducing or increasing the rate of speed of the wheel to adapt it to the widely-varying circumstances of the road at the will of the rider, such as heavy and hilly roads, level stretches, or the race-track.

My invention consists in the main driving spur-gears loosely sleeved upon the crank-shaft and rigidly connected intermediate gearing, with the operating mechanism and the manner of inclosing the same, and details of construction and combination and arrangement of parts, as hereinafter described, shown in the accompanying drawings, and specifically pointed out in the claims.

In the accompanying drawings, Figure 1 is a side elevation of a bicycle provided with my improved gearing. Fig. 2 is a central horizontal section through gear-box. Fig. 3 is a transverse central section through gear-box. Fig. 4 is a detail of clutch-face. Fig. 5 is a detail of clutch-operating levers. Fig. 6 is a perspective view of the clutch-operating mechanism.

In the figures, 1 is the pedal-shaft.

2 and 3 are spur-gears, one larger in pitch diameter than the other, sleeved loosely upon the pedal-shaft. The spur-gear 3 is provided with the extended sleeve 4 on its outer face, upon which is keyed the driving sprocket-wheel 5.

The inner faces of both driving-gears 2 and 3 are provided with clutch-jaws 6, adapted to engage the centrally-placed clutch 7, moving longitudinally upon the shaft and secured by the spline 8.

9 is a metallic casing, through which the pedal-shaft passes and which incloses the speed-gearing and clutch. This serves to unite the frame members, which are inserted in bosses prepared to receive them at X, Y, and Z. Ball-bearings are formed in this casing as follows: The extended sleeve 4 of the gear 3 is grooved at 10 to form a run for the balls, and the cone-rings 11 and 12, provided with bearing-grooves 13 and 14, are inserted over the sleeve 4 in the face of the casing 9, and the balls 15 are inclosed between the grooves in the rings and the sleeve 4. At the other side of the shaft the gear 2 is wholly within the wall of the casing, and a short sleeve 16, secured to the shaft, is provided with the grooved channel 17 for the ball-bearing, and similar rings 11 and 12 inclose the balls, and are also screwed into a threaded opening in the casing. This arrangement of the collars permits a slight longitudinal adjustment of the ball-bearings when necessary.

The intermediate gears and connecting-shaft are hollowed out internally at 21 to make the piece lighter and at either extremity to form ball-bearings at 22. The balls 23 are inclosed between these bearings and the conical extremities 24 of the plugs 25 inserted in threaded openings in the walls of the casing. These can easily be adjusted from outside the casing as desired.

The operation of this gearing is as follows: When the clutch is thrown to engage the sleeve 3, upon which the sprocket-wheel is secured, the direct pedal speed will be communicated to the shaft without friction; but when the clutch is thrown to engage the gear 2, which is the smaller in size, the speed will be reduced through the intermediate large gear 18, small gear 19, and large gear 3, so that a greatly-reduced speed may be obtained, varying with the exact proportions of the gears. If a higher speed instead of a lower speed is desired, it can be obtained by reversing the position of the intermediate gearing, and also altering the size of the driving-gear to correspond. With the higher speed the sleeve 3, bearing upon the shaft, would produce some friction, which might be objectionable, so that, if desired, balls may be inserted between the sleeve and shaft.

The manner of operating the clutch 7 is shown clearly in Figs. 1 and 3, where 27 is a groove in the clutch, and 28 a ring sleeved in the groove. 29 is the operating-fork, in the arms of which the pins 30 are inserted in slots 31. The stem of the fork is seated at 32 in the casing and provided with a rectangular recess 33, in which is seated the squared extremity of the rod 34, which extends upward by the side of the saddle-post frame to the upper rail, where it is cranked at 35 and connected by a rod 36 with the hand-lever 37, pivoted on the frame at 38. The rod 34 is secured in its seat by means of the shoulder 39 and cap 40 inserted in the threaded opening 41 in the casing.

I do not claim the exact size of the casing or exact proportion of gears, neither do I limit myself exclusively to the exact means for operating the clutch, since any lever mechanism that would be accessible from the seat of the rider would be suitable for the purpose.

Having described my invention, what I claim as new, and desire to secure by Letters Patent, is—

1. In a change gearing for a bicycle, the combination of, a driving shaft, driving gear loosely sleeved upon the shaft and provided with inner clutch faces, a clutch sleeved upon the shaft between the gears, intermediate change gearing upon an integral shaft adapted to engage said loose gears, with an inclosing casing formed in one integral hollow piece provided with extensions to which the frame members are secured, and openings in which the said shaft bearings are supported, the said openings being of sufficient size to allow the aforesaid mechanism to be introduced therethrough, substantially as described.

2. In changeable speed gearing for a bicycle, the combination of, a driving shaft, driving gears sleeved over said shaft provided with inner clutch faces, a sleeved extension upon the outer face of one gear, a corresponding sleeve adjacent to the other driving gear secured to the shaft, a clutch sleeved upon the shaft between the gears, intermediate gears engaging said driving gears, with an inclosing casing constructed in one piece, and ball bearings for the aforesaid sleeves, consisting in balls and threaded cones inserted in openings in the casing of sufficient size to permit the introduction therethrough of the various parts of the mechanism, substantially as described.

3. In combination with changeable speed gearing substantially as described, an inclosing case for said gearing formed in one integral piece provided with large threaded openings in which the cone bearings for the driving shaft are inserted, and smaller threaded openings in which the cone bearings for a secondary shaft are inserted, a double clutch on the driving shaft, and mechanism for operating the clutch, consisting in, the fork 29 pivoted in the casing at 32 and cranked rod 34 detachably engaging said fork to facilitate the introduction of the fork within the casing, and operating rod and lever exterior to the casing, substantially as described.

4. In combination with changeable speed gearing for a bicycle, driving and secondary shafts and double clutch upon the driving shaft, a casing formed in one integral piece provided with threaded openings in which the cone shaft bearings are inserted, and operating mechanism for said clutch, consisting in exterior rods and cranks, and an interior fork separated from said exterior mechanism for the purpose of introduction through one of said openings in said case, substantially as described.

5. In combination with changeable gearing for a bicycle provided with driving and secondary shafts, an inclosing case for said gearing constructed in one integral piece, provided with threaded openings in which the shaft bearings are inserted, the openings for the main shaft bearings being sufficiently large for the introduction of the said gearing therethrough, substantially as set forth.

GEO. G. POWELL.

Witnesses:
WM. M. MONROE,
C. H. OLDS.